(12) United States Patent
Osterlänger et al.

(10) Patent No.: US 6,470,909 B2
(45) Date of Patent: Oct. 29, 2002

(54) HYDRAULIC SYSTEM

(75) Inventors: Jürgen Osterlänger, Emskirchen; Gerhard Prosch, Höchstadt; Walter Parzefall, Bubenreuth, all of (DE); Jean-Francois Heller, Illkirch-Grafenstad (FR); Manfred Homm, Bühl-Neusatz (DE); Alexandre Fidline, Karlsruhe (DE); Eugen Kremer, Bühl (DE)

(73) Assignee: LuK Lamellen und Kupplungsbau Beteiligungs KG, Baden/Buhl (DE)

( * ) Notice: Subject to any disclaimer, the term of this patent is extended or adjusted under 35 U.S.C. 154(b) by 0 days.

(21) Appl. No.: 09/733,758

(22) Filed: Dec. 8, 2000

(65) Prior Publication Data
US 2001/0020415 A1 Sep. 13, 2001

(30) Foreign Application Priority Data
Dec. 10, 1999 (DE) .......................... 199 59 469

(51) Int. Cl.⁷ .............................................. F16K 21/10
(52) U.S. Cl. .................. 137/514.3; 137/514; 137/493.8
(58) Field of Search ................... 137/514, 514.3, 137/514.5, 514.7, 493.8

(56) References Cited

U.S. PATENT DOCUMENTS

| | | | | | |
|---|---|---|---|---|---|
| 2,490,511 A | * | 12/1949 | Courtot | .................. | 137/514.3 |
| 2,941,629 A | * | 6/1960 | Rohacs | .................... | 137/514.3 |
| 3,027,913 A | * | 4/1962 | Chatham et al. | ......... | 137/484.2 |
| 3,361,151 A | * | 1/1968 | Van House | ............ | 137/115.26 |
| 3,554,611 A | * | 1/1971 | Kawabe et al. | .......... | 137/514.3 |
| 3,850,405 A | * | 11/1974 | White | ..................... | 137/514.3 |
| 3,866,984 A | * | 2/1975 | Seip | ........................... | 188/195 |
| 4,091,838 A | * | 5/1978 | Dowty et al. | ............ | 137/514.5 |
| 4,195,552 A | * | 4/1980 | Neff | ........................ | 137/493.8 |
| 5,158,109 A | * | 10/1992 | Hare, Sr. | ................. | 137/514.3 |
| 5,960,822 A | * | 10/1999 | Matuschka et al. | ...... | 137/493.8 |
| 6,148,853 A | * | 11/2000 | Wang | ..................... | 137/493.6 |
| 6,164,320 A | * | 12/2000 | Hamano et al. | ......... | 137/493.2 |

FOREIGN PATENT DOCUMENTS

| | | | |
|---|---|---|---|
| GB | 2 032 581 A | | 5/1980 |
| GB | 2032581 A | * | 5/1980 |

\* cited by examiner

Primary Examiner—Michael Powell Buiz
Assistant Examiner—Ramesh Krishnamurthy
(74) Attorney, Agent, or Firm—Darby & Darby

(57) ABSTRACT

A hydraulic system for a motor vehicle has at least one pressure restricting valve with a housing that has two or more connections. At least one conduit cross-section in the housing can be closed by means of a closing body that is movable axially against the action of an energy accumulator. At least a part of the axial travel of the closing body is damped by means of a damping device.

41 Claims, 7 Drawing Sheets

HYDRAULIC SYSTEM

BACKGROUND OF THE INVENTION

The invention relates to a hydraulic system, more particularly for motor vehicles having a damping device or at least one pressure restricting valve, wherein at least one closing body which can be moved against the action of an axially active energy accumulator seals a conduit cross-section of the hydraulic system.

Hydraulic systems of this kind are used in particular in motor vehicles as devices for operating brakes, as power steering systems and as a device for operating friction clutches, for example in the force flow between an internal combustion engine and a gearbox and/or an electric machine and a drive train. Damping devices such as illustrated for example in GB 20 32 581, are thereby used to dampen pressure shocks in the pressure medium. Damping devices of this kind have at least one closing body axially biased by an energy accumulator and producing at a predetermined closing pressure the connection between the two connector members. Arrangements of this kind are particularly susceptible to periodically recurring pressure shocks in the pressure medium and react when excited in this way for example with noises such as squeaking noises.

If a pressure restricting valve of this kind is installed in a conduit train with the formation of two individual lines, then there is the further drawback that when filling the hydraulic system with pressure medium the two conduit trains have to be filled individually since the pressure restricting valve sealingly separates the two conduit parts from each other.

OBJECT OF THE INVENTION

The object of the invention is therefore to provide a hydraulic system which dampens vibrations entering into the pressure medium and which has an improved method of operation with regard to reducing the development of noise, is more cost-effective to produce and which is easier to assemble. Furthermore the hydraulic system is to be able to be filled entirely from one filling station.

SUMMARY OF THE INVENTION

The foregoing objective is achieved through a hydraulic system which has at least one pressure restricting valve comprising a housing with at least two connections and at least one conduit cross-section which can be closed by a closing body which is axially movable against the action of an energy accumulator, wherein at least a part of the axial travel of the closing body is damped. In this way it is possible to avoid any resonance excitation of the closing body through the pulsating medium, whereas an undamped closing body which is only biased with one energy accumulator can enter into resonance with the pressure medium and thus cause onerous noises.

According to the inventive idea for this purpose the damping device can be formed from an energy accumulator element and at least one friction element. By way of example an energy accumulator which axially biases at least one closing body of a damping device can be provided to act in parallel or serially with a friction device, wherein the case of a parallel method of operation the axial movement of the closing body is combined immediately or after a predetermined axial travel of the closing body with an adjusting friction moment. The friction moment can thereby be adjusted linearly, progressively or degressively by the axial path. Furthermore the friction moment can be from the speed of the axial movement of the closing body.

By way of example energy accumulator elements which axially impinge on the closing body can be coil compression springs, rubber elements and/or compressible fluids which for this purpose can be housed in a practically closed chamber and against which the closing body is moved axially under the volume contraction of the chamber. The energy accumulator is for this purpose advantageously supported fixed on the housing indirectly through a piston or the like or directly, for which suitably formed stops can be provided on the housing, connected in one piece with the housing, or additional component parts can be brought to stop with the housing, so that the closing body can be supported against the action of the energy accumulator. It is evident that any type of energy accumulators can also be installed under pretension or with play in the force flow between the closing body and the housing.

An advantageous friction element according to the inventive idea can be active hydraulically—for example hydrodynamically and/or hydrostatically—and/or mechanically. Thus for example a friction element can be formed on the basis of a shearing action of a viscous fluid, whereby the viscous fluid can be introduced between a component part of the closing body and a component part fixed on the housing, and in the event of relative movement between the two parts can act as a fluid friction element.

Furthermore when using an internally hollow closing body in conjunction with an axially acting spring element, for example a coil compression spring which engages axially in the closing body and is supported axially on the base of the closing body on one side and on the housing of the pressure restricting valve on the other, an advantageous behaviour can be observed, for example a noise-dampening effect, without having to provide a separate friction device. Tests have shown that the cause for this is an internal friction of the arrangement and/or the position of the point of engagement of the spring element in the closing body so that the connecting point which has been placed axially forwards has positive effects on the tilting behaviour of the closing body. Through this hollow design with an adequate axial guidance of the closing body the connecting point of the spring element can be moved towards the conduit cross-section or sealing edge of the pressure restricting valve. Advantageously the connecting point can be moved into the front half, preferably into the front third of the axial extension of the closing body. Furthermore mass concentrations axially between the connecting point and the front part of the closing body facing the sealing edge can have advantageous effects, for example a shock absorber effect for vibrations in the pressure medium. It is evident that the connection of the spring element inside the closing body can also be advantageous for designs having a friction element.

According to an inventive idea it can be advantageous to arrange at least two pressure restricting valves in a housing wherein these can advantageously be arranged to act opposite one another. The housing can be a separate housing introduced in a conduit, and it is furthermore possible to arrange one or more pressure restricting valves in a functional component part belonging to the hydraulic system, for example a master cylinder and/or a slave cylinder, whereby particularly favourable arrangements can be formed with regard to the number of component parts.

The arrangement of two or more pressure restricting valves in a housing produces in a particularly advantageous way so-called "vibration filters" of high quality since a bi-directional damping of pressure fluctuations in the pressure medium can be filtered effectively and bi-directional. These damping devices can be particularly advantageous if designed and fitted with damped pressure restricting valves according to the inventive idea.

One advantageous development of a hydraulic system of the said type provides at least one closing body which consists of at least two relatively displaceable parts. These parts can engage radially into each other—and can be formed hollow on the inside so that during displacement of the two parts relative to each other a changing volume can be formed in a chamber enclosed by the two parts. The two parts, for example the closing body itself and a component part, such as for example a piston, radially adjoining the inside walls of the closing body with sealing action, and which can likewise be hollow, can contain a compressible fluid, for example a gas such as air or a foam body, for example formed from compressible hard foam which is reversibly deformable. In this way an energy accumulator element can be contained in the two-part closing body. The friction element according to the inventive idea can be formed mechanical, whereby the walls between the closing body and the piston displaceable axially relative thereto, mechanically form a friction device during a relative movement of the two parts. At least one of the contact faces of the closing body or of the piston can hereby be suitably pre-treated or coated in order to set the required friction value of the two parts relative to each other. It can also be advantageous to provide in the fluid or foam body a corresponding inner friction, for example through added friction materials. It is evident that the piston can be supported on a part fixed on the housing against the action of the energy accumulator which is provided between the piston and closing body. Furthermore the second component part or piston or ram can be fixedly connected to the housing and can engage axially into the opening provided on the side opposite the sealing face of the closing body.

Furthermore it can be advantageous to provide instead of the fluid or foam body provided in the chamber, a coil compression spring which is tensioned between the closing body and the component part fixed on the housing such as the ram or piston. A mechanical friction device can also be provided here between the walls of the closing body and the piston, but it is particularly advantageous to fill the ensuing chamber with pressure medium and to provide a connection for the pressure medium between the chamber in the closing body closed by the piston and a chamber which is connected directly to or formed by the conduits of the hydraulic system—for example a chamber in the region of a valve seat which is closed by the closing body—. This connection can then be designed so that a friction element is formed through the shearing action of the pressure medium during displacement of the part fixed on the housing, such as the piston, against the closing body. The connection can thereby be formed from at least one and advantageously from several longitudinal grooves spread out over the interior circumference of the closing body and shaped, for example imprinted, in the closing body and/or in the piston. Through the length, cross-section, shape and/or number of longitudinal grooves it is possible to adjust the friction moment required. Furthermore it can be advantageous to select the coefficients of heat expansion of the two materials—piston, closing body material—and to match them with each other so that the temperature-dependence of the viscosity of the pressure medium is at least partially compensated.

Through this arrangement according to the invention during axial displacement of the closing body as the valve opens pressure medium is forced out of the closing body chamber and causes a friction moment as a result of the shearing action in the longitudinal grooves. The same process can arise in the reverse flow direction of the pressure medium during relaxation of the pressure of the medium and therefore during closing of the pressure restricting valve through the closing body.

It can furthermore be advantageous to provide in addition or as an alternative in the closing body an opening having a predetermined diameter through which the pressure medium can escape during displacement of the closing body opposite the piston. This opening, for example a bore, can be provided in the front region of the closing body, for example on a conical or frusto-conical shoulder in the region of the valve seat. Through such arrangements it is possible in particular to produce fluid friction moments which are substantially independent of the temperature-dependence of the viscosity of the pressure medium. A further advantage can be for example a simple production with fewer critical structural tolerances.

A conical or frusto-conical design of the front region of the closing body is particularly advantageous for optimising the control cross-sections since the surface ratio of the surface which is biased by the pressure medium is smaller in the case of a closed valve than when the valve is opened. It has proved particularly advantageous to design the angle of conicity of the conical or frusto-conical end of the closing body in the region of between 20° and 90°, preferably between 20° and 25°. Furthermore it has proved advantageous to arrange the two connections of for example the inlet pipe and outlet pipe at an angle to each other. A angle of 135° to 45°, preferably 90°, is thereby advantageous between the two connections.

Furthermore according to the inventive idea it is particularly advantageous to design a hydraulic system having at least one pressure restricting valve separating the two conduits from each other and which separates two conduit trains from each other, in order to simplify the filling process with pressure medium prior to start-up, so that the hydraulic system can be filled completely from one filling opening, for example by applying vacuum. For this purpose according to the invention a by-pass is provided between the two conduit trains, namely in the region which under pressure-less conditions is by-passed through the at least one pressure restricting valve with closing body which acts with sealing action on the valve seat. This by-pass is designed so that it only opens at the moment of the filling process and automatically closes when the filling process has been completed.

For this purpose a seal can be provided parallel to the at least one pressure restricting valve which only undertakes its function after contact with the pressure medium. For the seal materials can be provided here which swell up on contact with the pressure medium and thus close a gap serving as the by-pass by swelling on contact with the pressure medium. The seal can thereby be formed so that it leaves a gap free radially on the inside and/or radially on the outside which is closed after a swelling process. Particularly advantageous here is the use of NBR (nitrile butadiene rubber) wherein the pressure medium can advantageously be brake fluid or the like.

Particularly advantageous developments of the hydraulic system according to the invention can be release devices for hydraulically operated friction clutches, brake devices, power steering systems and/or the like. Particularly in the case of clutch release devices it can be advantageous to match the hydraulic system to a damping of frequencies in the range below one kilohertz, preferably between 80 and 60 Hz and more particularly between 80 and 100 Hz, since in this range swaying and/or axial vibrations of the internal combustion engine can be transferred through the crankshaft to the release system.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention will now be explained in further detail with reference to FIGS. 1 to 12 in which.

DETAILED DESCRIPTION OF PREFERRED EMBODIMENTS

Figure 1:
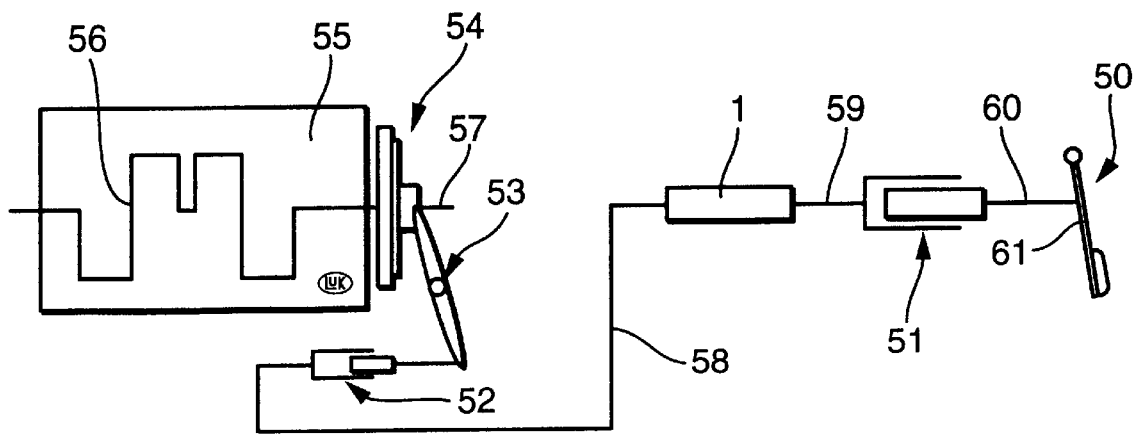
FIG. 1 shows a diagrammatic view of a hydraulic system using an embodiment of a clutch release device.

FIG. 1 shows a diagrammatic view of a possible design of a hydraulic system with a pressure restricting valve 1 using a clutch release device 50 with a master cylinder 51 and a slave cylinder 52. The pressure restricting valve 1 is in this illustrated embodiment installed in the conduit parts 58 and 59 and separates these from each other in the non-opened state. It is evident that in other embodiments the pressure restricting valve 1 can be integrated into the master cylinder 51 or into the slave cylinder 52 as well as in other hydraulic systems, for example brake systems, power steering systems and the like, into one functional component part. Furthermore a pressure restricting valve according to the invention can be advantageous in any hydraulic conduit system advantageously as a pressure restricting valve and/or as a filter for filtering out oscillations, for example a "vibration filter".

The clutch release system 50 actuates the clutch 54 hydraulically by biasing the master cylinder 51 using an actuating member 61 which can be a foot pedal, actuator, for example an electrical actuator, or the like. Pressure is hereby built up in the master cylinder 51 by means of a mechanical transmission 60 and the master cylinder 51 builds up pressure in the slave cylinder 52 through the conduit train 59, through the pressure restricting valve 1 and through the power train 58. The slave cylinder 52 can—as in the illustrated example—apply through a release mechanism 53, such as a lever with a release member and where necessary a release bearing, the required release force on the clutch or on the release elements, such as the plate spring. Further embodiments can provide a slave cylinder 52 which is mounted coaxial about the gear input shaft 57 and in which the release mechanism 53 is configured accordingly. In order to apply the release force the slave cylinder is each time fixed secured on the gearbox housing (which is not shown in further detail), or on another component part fixed on the housing. When the clutch 54 is closed the gear input shaft 57 transfers the torque of the internal combustion engine 55 to a gearbox (not shown in further detail) and then to the drive wheels of a motor vehicle.

Through the combustion processes in the internal combustion engine 55 the crank shaft 56 is subjected in dependence on the configuration of the internal combustion engine 55, for example in dependence on the number of cylinders, to irregular loads which manifest themselves in the form of axial and/or swaying vibrations and which are transferred through the release mechanism 53 to the slave cylinder 52, the conduit system 58, 59 to the master cylinder 51 and from there through the mechanical connection 60 to the operating member 61. In the case where a clutch pedal is used as the operating member these vibrations are considered as unacceptable. In the case where an actuator is the operating member 61 the result of the vibrations can be for example a reduced control accuracy or a shortened service life. The pressure restricting valve 1 is therefore switched into the conduits 58, 59 for damping and is matched accordingly to dampen the vibrations introduced by the crankshaft 56. The frequency range of such vibrations is typically at 50 to 200 Hz. Furthermore a pressure restricting valve prevents the appearance of pressure peaks at the clutch 54, which can engage same too quickly and can thereby lead to damage to the drive train, for example if the clutch pedal 61 is suddenly let go.

FIGS. 2 to 5 show diagrammatically embodiments 1a, 1b, 1c, 1d of the damping device 1 of FIG. 1 in partial section. A closing body 2a, 2b, 2c, 2d is shown in each which closes an inlet opening 2 by means of a sealing seat or valve seat wherein it is tensioned with the housing 4, or a component part 5, 5a, 5b connected thereto, against the action of an energy accumulator, such as for example a coil compression spring 3. It is evident that the design of the closing body 1a to 1d, as shown in FIGS. 2 to 5 can be arranged in various ways in corresponding embodiments of damping devices 1a to 1d, wherein the arrangement of two closing bodies 2a to 2d mounted to act opposite one another in one damping device 1a to 1d can be particularly advantageous, especially where a closing body 2a to 2d is blocked in both directions against the action of the relevant energy accumulator 3, and different designs of closing bodies, for example closing bodies 2a to 2d, can be combined in one damping device.

Figure 2:
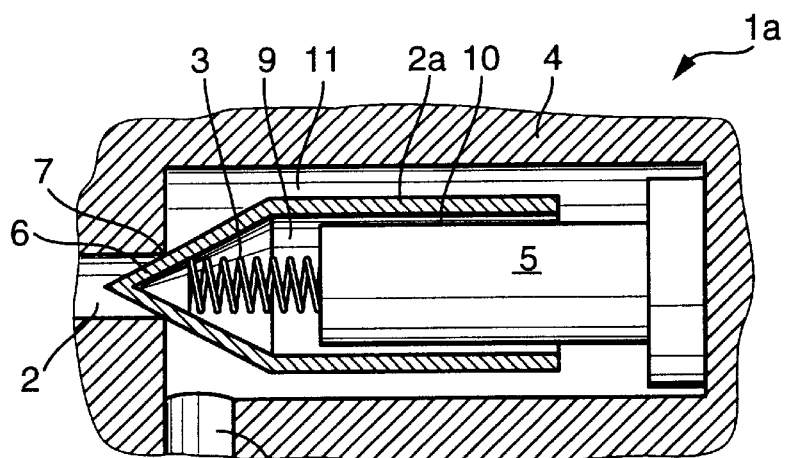
FIGS. 2 to 5 show advantageous design possibilities for a pressure restricting valve in a diagrammatic illustration.

FIG. 2 shows a section of a damping device 1a having a closing body 2a which has in the region of the first connection, for example the input channel 2 a conical shoulder 6 which seals against a valve seat 7 of the input opening 2. In the event of fluctuations in the pressure of the pressure medium in the input opening the control piston 2a is moved axially against the action of the energy accumulator 3 and thereby releases the path for the pressure medium in the direction of the output opening 8. The closing body 2a is hollow on the inside and is provided at the end opposite the cone 6 with an opening in which a piston 5 which is fixedly connected to or formed from the housing 4, engages axially. The closing body 2a and piston 5 are axially movable relative to each other against the action of the energy accumulator 3 and define a chamber 9 inside the closing body 2a. The chamber 9 is filled with pressure medium wherein a connection is formed by at least one longitudinal gap or longitudinal groove 10 to a chamber 11 which communicates with the input opening 2 or a second connection, for example the output opening 8. The cross-section and length of the longitudinal groove 10 are selected so that during relative movement of the closing body 2a opposite the piston 5 a fluid friction is produced which is dependent on viscosity, and thus the spring-biased relative movement of the closing body 2a relative to the piston 5 is damped, whereby pressure medium is pumped out from the chamber 9 and into the chamber 11 or vice versa, depending on the direction of movement. Furthermore on similar embodiments it is proposed to seal the piston 5 from the closing body 2a and to introduce a compressible fluid, for example air into the chamber 9 so that damping is achieved through the compression of the fluid contained in the chamber 9. An additional or alternative friction moment, parallel to the relative movement between the closing body 2a and the piston 5 can be produced through a mechanical friction of the surfaces of the two parts 2a, 5, whereby these surfaces can be finished accordingly for this purpose, by way of example the surfaces can be provided with a microstructured surface and/or coating. In the illustrated embodiment the input opening 2 and the output opening 8 are formed at approximately right angles to each other.

Figure 3:
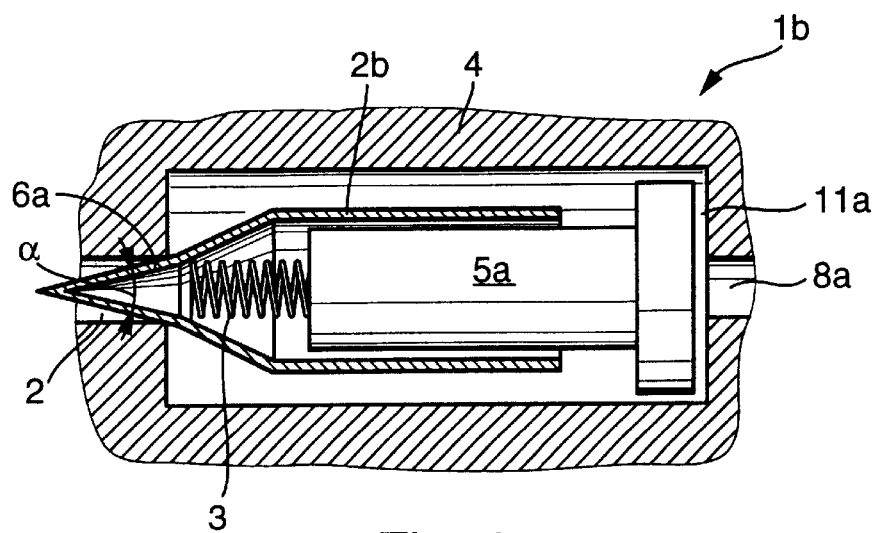

FIG. 3 shows a section of one example of the damping device 1d which in essential parts is identical with the embodiment 1a of FIG. 2 and which has in the region of the input opening 2 a conically shaped shoulder 6a of the closing body 2b whose angle of conicity is a <45°, preferably a <30°, whereby the surface ratio of the surface of the shoulder 6a when the input opening 2 is opened or closed can be designed so that with an enlarged axial path of the closing body a higher damping action can be achieved.

Furthermore the output opening 8a is arranged roughly in a line with the input opening 2 whereby the piston 5a has in the area where it bears against the housing 4 at least one groove 11a through which the pressure medium is introduced into the output opening 8a.

Figure 4:
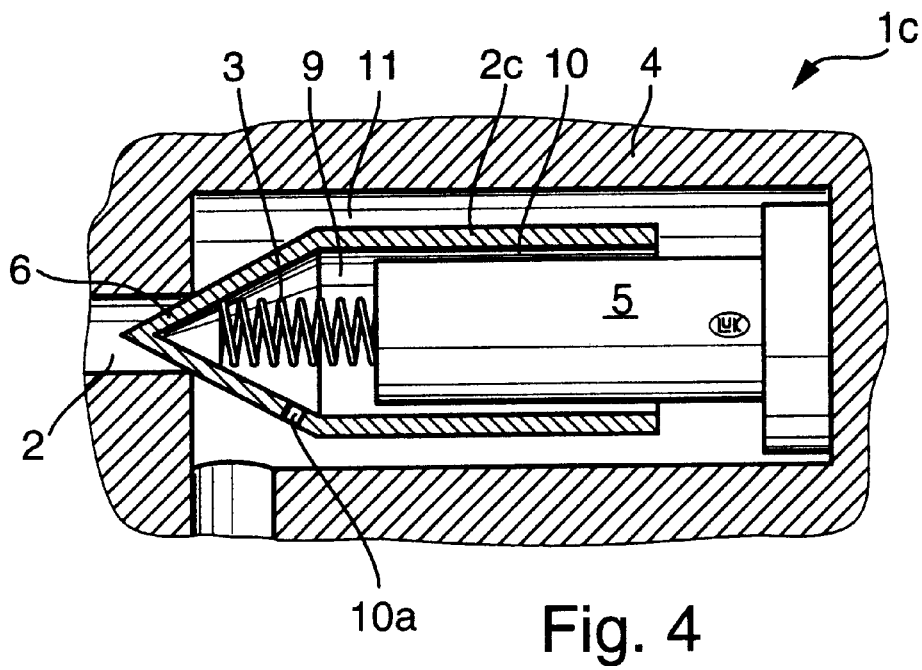

The embodiment 1c of FIG. 4 is identical except for an opening 10a in the region of the cone 6 of the closing body 2c. During axial displacement of the closing body 2c opposite the piston 5 the pressure medium is exchanged additionally or alternatively through the opening 10a between the chambers 11 and 9. Through the reduced length it is possible to solve the problem of tolerances, for example manufacturing tolerances, temperature-dependent viscosity of the pressure medium and/or material extensions of the piston 5 and/or closing body 2c.

Figure 5:
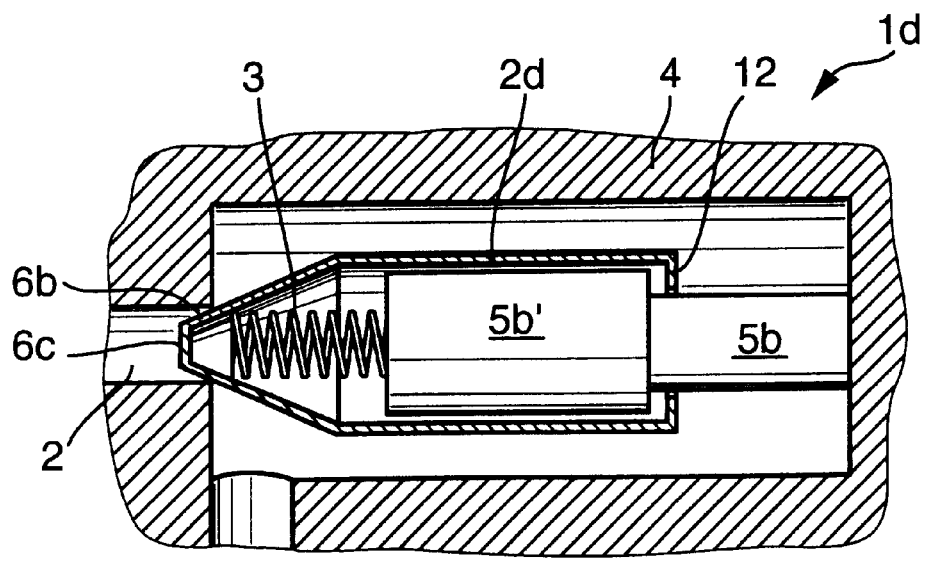

FIG. 5 shows an embodiment 1d having a closing body 2d in which the conical shoulder 6b has in the region of the input opening 2 a frusto-conical design 6c. A piston 5b' is housed in the closing body and is tensioned with the cone 6b of the closing body 2 against the action of the energy accumulator 3. The piston is housed against the force of the energy accumulator element 3 in the closing body 2d by means of stops 12 or a flanged edge 12 shaped radially inwards at the end opposite the cone 6b. A pre-assembled unit can thereby be formed from the closing body 2d, the energy accumulator 3 and the piston 5b, and the axial stop 5b can be connected by way of example integral with the housing 4 and engages through the stops 12 into the closing body, thereby biasing the piston 5b' against the action of the energy accumulator 3. The stop 5b and housing 4 can be formed as a one-piece injection moulded part.

The energy accumulator 3 of the embodiment 1a to 1d of FIGS. 2 to 5 is advantageously mounted between the conical shoulder (for example 6 in FIG. 2) and the piston 5 or 5b', 5a whereby the contact pressure of the energy accumulator 3 is placed as close as possible at its contact with the valve seat (FIG. 2) in order to counteract radial vibrations of the closing body. The materials of the piston 3 and closing body 2a to 2d can advantageously be selected so that their coefficients of expansion compensate at least in part the temperature-dependence of the viscosity of the pressure medium, that is for example by suitably selecting the coefficients of heat expansion the gap 10 in FIG. 2 becomes smaller as the temperature increases, whilst the viscosity of the pressure medium decreases in dependence on the temperature so that with different temperatures the largest possible constant amount of pressure medium can be transported through the gap 10.

Figure 6:
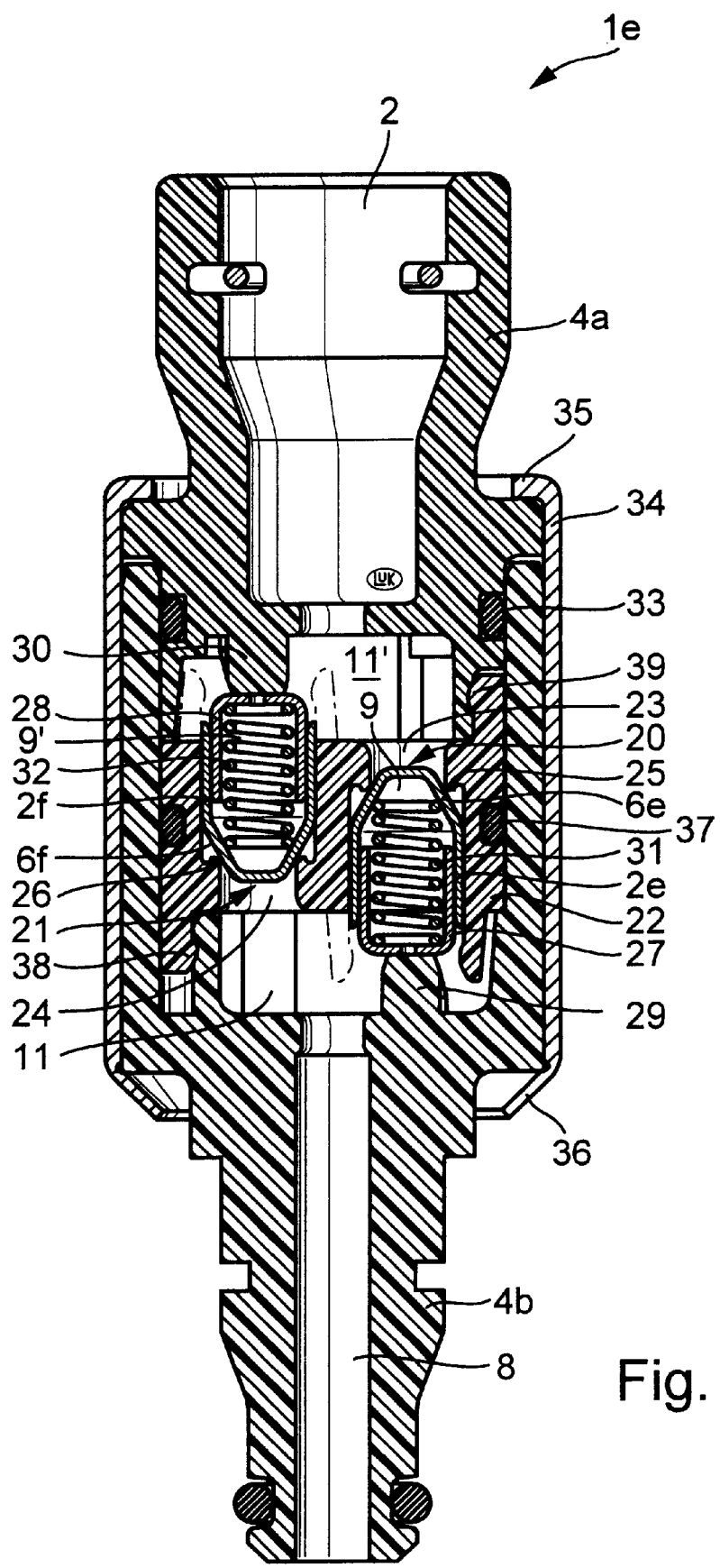
FIG. 6 shows an embodiment of a bi-directional pressure restricting valve.

FIG. 6 shows a longitudinal section through an embodiment of a damping device 1e, as can be used for example in FIG. 1 as a damping device 1. The damping device 1e can be used preferably as a "vibration filter" and/or pressure restricting valve in vehicles and comprises two housing parts 4a, 4b each with a connection 2, 8 and by means of which the damping device 1e can be inserted in a hydraulic conduit system. Two oppositely acting valves 20, 21 can be arranged between the input opening 2 and the output opening 8 and in the pressureless state sealingly separate the input opening 2 from the output opening 8. The valve devices 20, 21 are formed by a valve block 22 which is mounted axially between the two housing parts 4a, 4b and is common to both devices, with the valve block 22 having radially spaced openings 23, 24 in each of which a closing body 2e, 2f is positioned and centred. In the region of the frusto-conical shoulder 6e, 6f of the closing bodies 2e, 2f the valve block 22 has an undercut valve seat 25, 26 which forms a sealing seat with the frusto-conical shoulder 6e, 6f. The two valve seats 25, 26 are off-set axially from each other in particular for reasons of space.

The closing bodies 2e, 2f are formed hollow inside and are made for example from a deep-drawn metal or from plastics parts manufactured by the injection moulding process. Pot-shaped pistons 27, 28 engage axially in the closing bodies 2e, 2f, with the pistons each lying with their base against stops 29, 30 each formed from a housing part 4a, 4b and provided for this purpose. The closing bodies 2e, 2f and the pistons 28, 29 are each tensioned axially against each other by means of the coil springs 31, 32. A sealing connection is thereby formed between the closing bodies 2e, 2f and the valve seats 25, 26 which with regard to the contact pressure force is dependent on the spring constants of the springs 31 and 32. The energy accumulators in the sense of the invention such as here the coil compression springs 30, 31 can have different spring constants so that a different opening and damping behaviour can be set in both opening directions of the closing bodies.

During relative movement of the closing body 2e, 2f opposite the associated piston 27, 28, pressure medium is displaced or sucked up according to the direction of movement from the chamber 9 or 9' which is connected accordingly to the chamber 11, 11' through grooves (not shown in further detail), so that a fluid friction action is produced in the grooves as a result of the viscosity of the pressure medium. This friction action is superimposed in parallel on the energy accumulator elements 31, 32 so that the relative movement takes place through the formation of a hysteresis. For the damping action of the closing bodies 2e, 2f it can be advantageous to develop the friction and spring biasing serially and/or in parallel, whereby the energy accumulators 31, 32 can be pretensioned or the pistons 27, 28 and the closing bodies 2e, 2f can be displaced relative to each other at first without the action of the energy accumulators 31, 32 only under the action of the fluid damping and/or friction of the piston and closing body surfaces against each other.

The damping device 1e is formed as one unit from the housing parts 4a, 4b wherein one housing part—here the housing part 4b—engages radially over the other housing part—here the housing part 4a, and the two housing parts are sealed in their axially overlapping region by means of a seal 33. The two housing parts 4a, 4b are fixed axially by means of a sleeve 34, such as a steel sleeve which engages radially round same, wherein the steel sleeve 34 has at its end radial indentations 35, 36 which form axial stops for the housing parts 4a, 4b.

Assembling the damping device 1e is advantageously carried out so that the valve plate 22 is centred with the closing bodies 2e, 2f and the piston fixed therein, in an opening provided for this purpose and is introduced with sealing action by means of the seal 37 against the housing part 4b whereby the valve plate 22 is connected to the housing by means of a snap closure 38. The second housing part 4a is introduced into the housing 4b and is likewise connected to the valve block 22 by means of a detent or snap-fitting connection 39. The steel housing 34 with the radially inwardly aligned flanged edge 35 is pushed over the prefitted unit and is provided in the end position with a flanged edge 36. It is evident that instead of the steel sleeve 34 a plastics sleeve can also be provided having a flanged edge 35 which fixedly connects the two housing parts 4a, 4b axially together correspondingly by means of a snap-fitting connection provided instead of the flanged edge 36.

Figure 7:
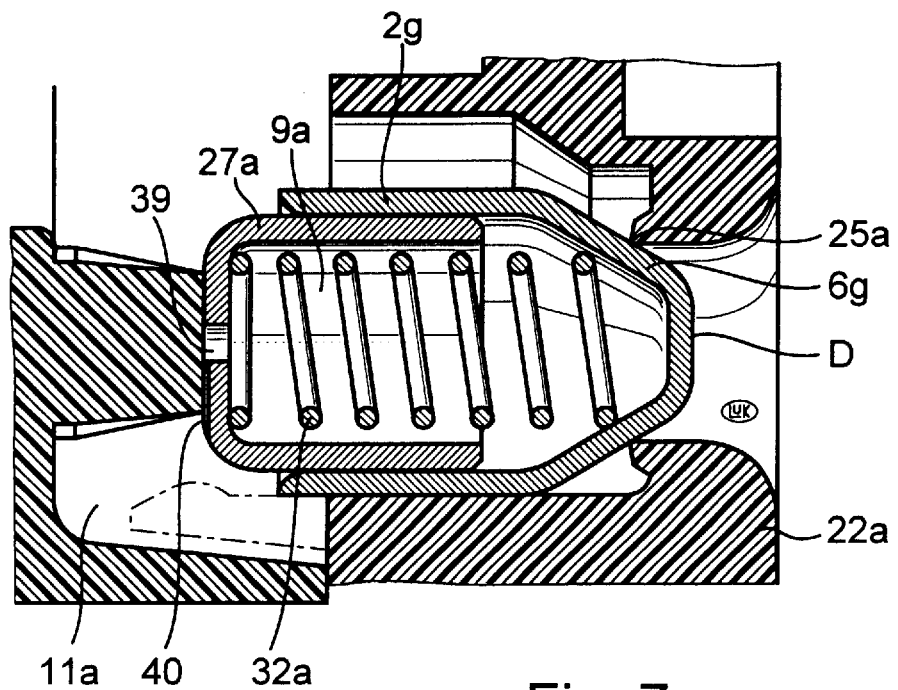
FIGS. 7 to 9 show advantageous design possibilities for closing bodies for a pressure restricting valve.

FIG. 7 shows a detail of a damping device similar to the damping device 1e of FIG. 6. The closing body 2g provided here forms in the region of its frusto-conical shoulder 6g a sealing connection with the valve seat 25a of the valve block 22a, with this connection being opened when the closing pressure is exceeded. The closing pressure is determined substantially by the surface D of the frusto-conical shoulder 6g defined by the valve seat 25a, and the drive force of the closing body 2g caused by the force of the energy accumulator 32a axially adjoining same. When the flow pressure is exceeded, for example through pressure fluctuations, an axial force acts on the closing body 2g as a result of the medium pressure and now biases the entire surface of the frusto-conical shoulder 6g. Through the relative movement of the closing body 2g opposite the internally hollow piston 27a the chamber 9a filled with pressure medium becomes compressed and pressure medium flows out of the opening 39 which is provided in the piston base, through at least one groove 40 running radially outwards in the base of the piston 27a, and into the chamber 11a. The axial movement of the closing body 2g opposite the piston 27a which runs against the action of the energy accumulator 32a is hereby damped through the fluid friction of the pressure medium. A delayed axial movement of the closing body 2g controlled by a hysteresis, and thus damping of pressure peaks in the medium, now takes place in dependence on this aforesaid damping.

Figure 8:
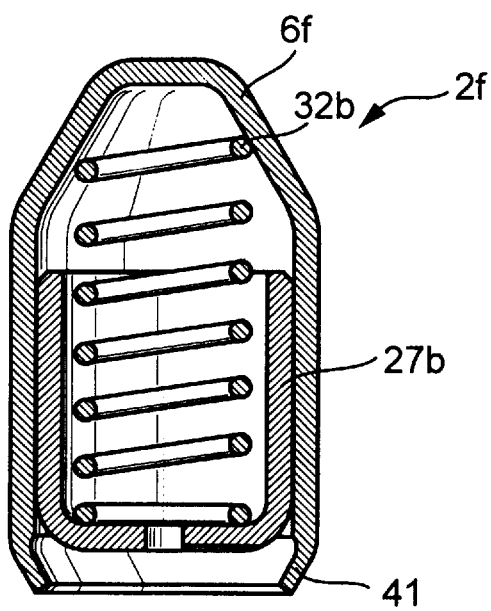

FIG. 8 shows a further advantageous development of a closing body 2f in which a piston 27b is introduced, whereby after introducing the piston 27b into the internal hollow closing body 2f the closing body is attached at its open end opposite the frusto-conical closed shoulder 6f by a flanged edge 41 which restricts the cross-section of the opening so that the piston 27b can be housed secured against loss in the closing body 2f, with the closing body 2f and the piston 27b being tensioned against each other axially against the action of an energy accumulator 32b. The radius of the flanged edge 41 is furthermore designed so that an axial stop (not shown in further detail but fixedly connected to a housing which is likewise not shown), can engage through the remaining opening into the closing body 2f and can axially bias the piston 27b.

Figure 9:
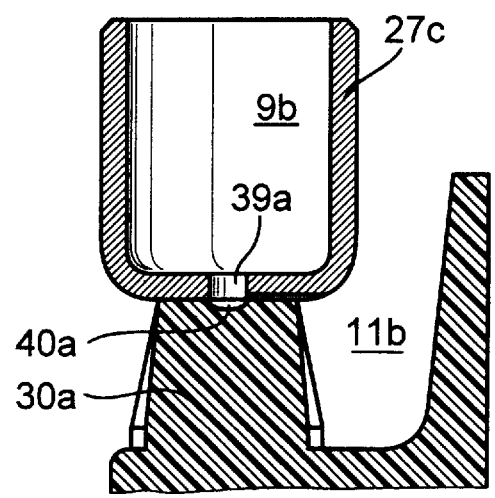

FIG. 9 shows a further advantageous development of a piston 27c which is similar to the pistons 27a, 27b of FIGS. 7 and 8 but which unlike these has not radially aligned grooves but only an opening 39a for the exchange of pressure medium between the chambers 9b and 11b whereby at least one transverse groove 40a is provided in the axial stop 30a to ensure when the piston 27c bears against the stop 30a the exchange of pressure medium between the two chambers 9b, 11b.

It is evident that the closing bodies 2a to 2f can advantageously hold the pistons 5a to 5d or 27, 28, 27a, 27b, 27c secured against loss whereby the secure hold of the piston can be achieved by means of stops, snap-fitting connections, bayonet locks, friction connection and the like.

Figure 10:
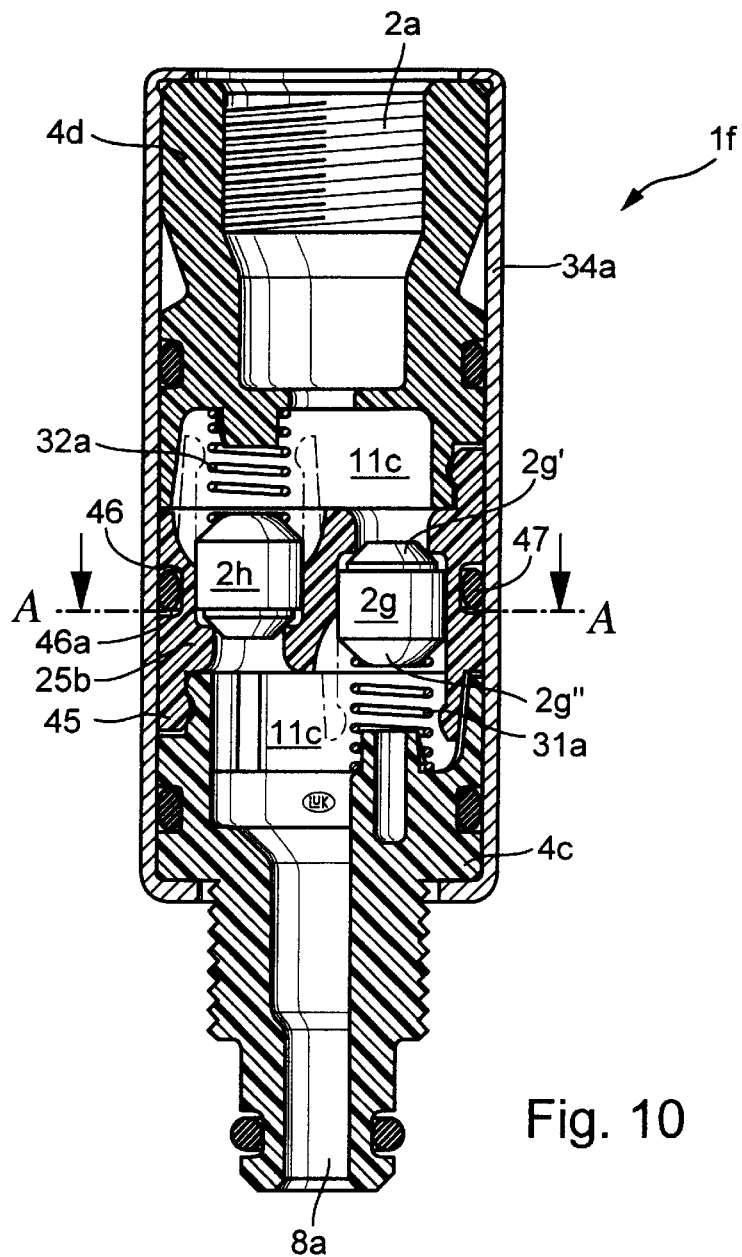
FIG. 10 shows a further advantageous design example of a bi-directional pressure restricting valve.

FIG. 10 shows an embodiment of a damping device 1f which is similar to the damping device 1e of FIG. 6 but in which the closing bodies 2g, 2h are supported directly on the housing parts 4c, 4d against the action of energy accumulators 31a, 32a. The closing bodies 2g, 2h can be formed in two parts wherein—for example as shown on the closing body 2g—two closing body parts 2g', 2g'' are boxed inside each other and are displaceable relative to each other with the interposition of a further damping device. The damping device acting here can be a friction device, for example a fluid friction device or a friction device where the surfaces of the two parts 2g', 2g2' rub mechanically against each other, whereby an axially acting energy accumulator can be additionally superimposed on this friction device so that the closing bodies 2g, 2h form per se a damping device which are displaceable axially opposite the housing part 4c or 4d. . . against the action of the energy accumulators 31a, 32a.

If a damping device corresponding to the damping device 1 is used in a conduit system 50 of FIG. 1, this hydraulic system cannot be filled completely with pressure medium from one side, for example from the side of the master cylinder 51, since the pressure restricting valves seal the conduit parts 2a, 8a from each other. For this measures are undertaken in the damping device if through which during an initial filling a by-pass is provided between the first connection 2a and the second connection 8a. This bypass is produced by means of at least one longitudinal groove 45 which is provided in the valve body 25b and which connects right through the two chambers 11c and 11c' for the medium. The longitudinal groove 45 is interrupted by a ring-shaped tap-in hole 46 which forms a ring-shaped chamber in which a seal 47 is housed. The geometric conditions of the cross-sections of the tap-in hole 46 and the seal 47 are selected so that the seal in the initial state releases a gap 46a—as shown here—radially between its internal circumference and the external circumference of the tap-in hole 46 and/or between its external circumference and the internal circumference of the steel sleeve 34a which axially fixes the two component parts 4c, 4d as well as the valve body 25b, so that during filling of the hydraulic system (see FIG. 1) the pressure medium can pass through the gap and past the closed valves with the closing bodies 2g, 2f. The material properties of the seal 47 are thereby selected so that they swell up on contact with the pressure medium and sealingly close the gap 46a after filling the hydraulic device. NBR can be used by way of example as a material with these properties. It is evident that embodiments with a by pass of this kind can be advantageous for all valves which are closed under filling conditions, by way of example one-way valves.

Figure 10A:
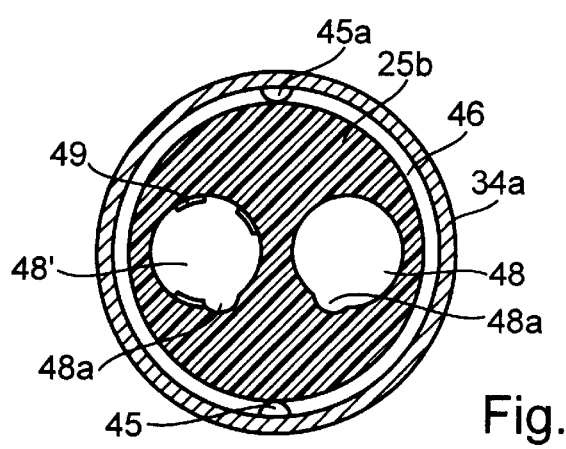
FIG. 10a shows a section along the line A—A through the pressure restricting valve of FIG. 10.

FIG. 10a shows a cross-section through the damping device if of FIG. 10 along the line A—A and from which the closing bodies 2g, 2h are omitted. The ring-shaped tap-in hole 46 in which the seal 47 (FIG. 10) is introduced to maintain a gap prior to the filling process, can be seen radially between the steel sleeve 4a and the valve body 25b. In order to connect the two chambers 11c, 11c' shown in FIG. 10, two longitudinal grooves 45, 45a are provided spread out round the external circumference of the valve body 25b. After the filling process the seal 47, shown in FIG. 10 by reference numeral 47 and swelling on contact with the pressure medium, now swells up and sealingly closes the ring-shaped tap-in hole 46. It is evident that embodiments can also be advantageous where the seal 46 (FIG. 10) substantially fills out the tap-in hole 47, whereby circumferential spread-out longitudinal grooves can be provided in the radially outer and/or radially inner sealing surface—here in the steel sleeve 34a and/or valve block 25b—and become closed by the seal 46 when it swells up.

Two openings 48, 48' can be seen in the valve body 25b radially spaced out from each other and in which the closing bodies 2g, 2h of FIG. 10 are introduced. For this longitudinal grooves 48a, 48a' can be provided which when the closing body is opened allow the pressure medium to pass from the chamber 11 to the chamber 11c' (FIG. 10) or vice versa. Furthermore axial stops 49 can be provided for the closing bodies 2g, 2h (FIG. 10).

Figure 11:
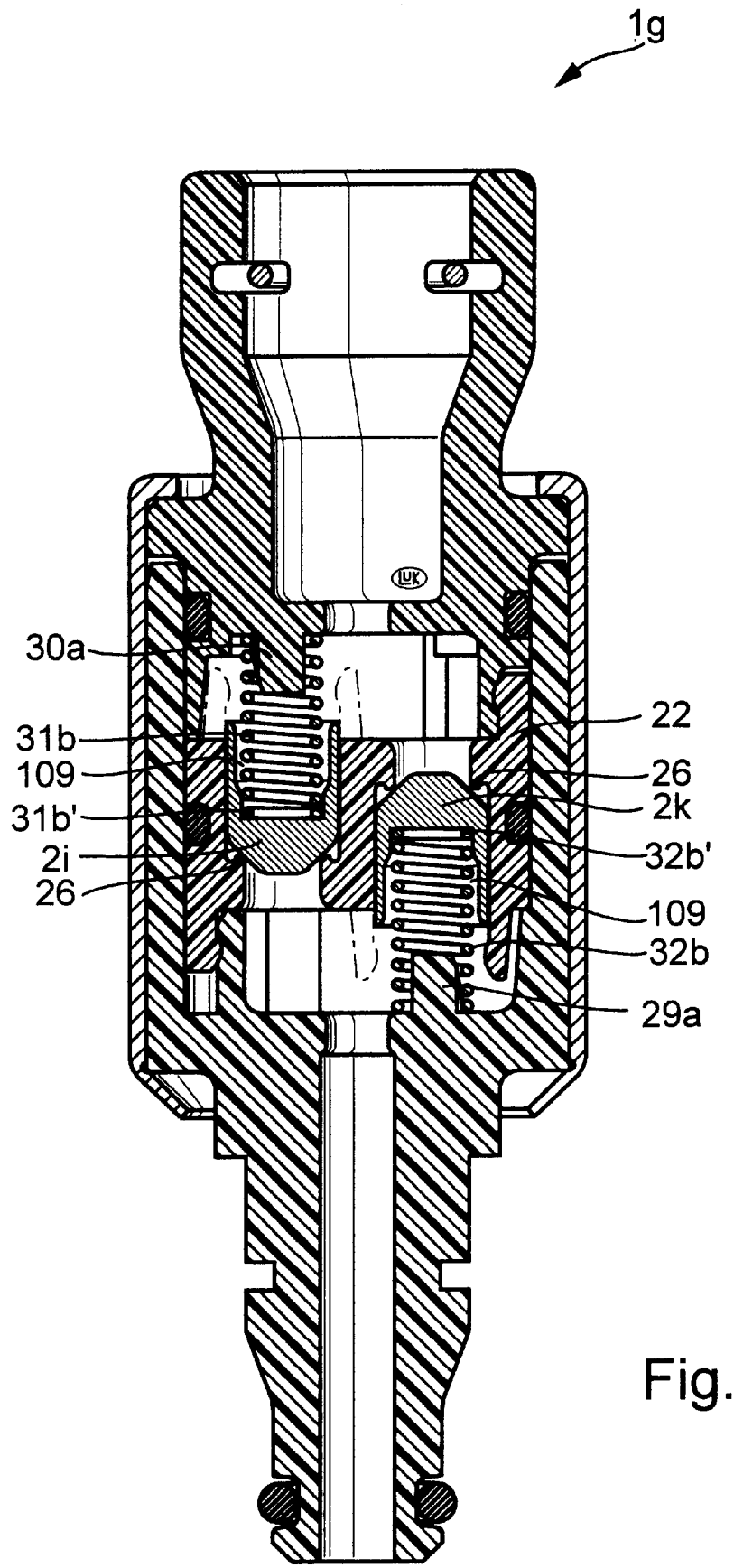
FIG. 11 shows a further embodiment of a bi-directional pressure restricting valve.

FIG. 11 shows an embodiment 1g which is similar to the damping device 1e of FIG. 6 and only differs in the design of the closing bodies 2i, 2k as well as their axial biasing with the spring elements 31b, 32b which are here formed as coil compression springs. The closing bodies 2i, 2k are hollow cylindrical with a conical profile in the region of the sealing edges 26 of the valve block 22. The coil compression springs 31b, 32b each engage axially into the openings 109, 109' whereby these can have different characteristics and/or spring constants in order to match the opening behaviour of the closing bodies 2i, 2k. The connecting points 31b' and 32b' formed as axial stops are each arranged axially in the region of the sealing edges 26, which can also be shaped differently—compared with each other. It is evident that by suitably selecting the diameter of the openings 109, 109' the connecting points 31b', 32b' can also be advantageously axially level with the sealing edges 26 or beyond in order to obtain specially designed closing bodies 2i, 2k. The axial guidance of the closing bodies 2i, 2k is undertaken in the valve block 22. For this in order to minimize the friction the valve block can be suitably treated on its surface at least in the region of contact with the closing bodies 2i, 2k, and can be for example greased, honed, ground and/or surface-roughened or surface-structured. The coil springs 31b, 32b are supported on the housing side and are advantageously guided radially, such as in the illustrated embodiment by providing axially raised stops 29a, 30a which engage axially into the springs 29a, 30a. The interaction between the coil springs 31b, 32b with the correspondingly formed spring constants and the stops 29a, 30a—which can be advantageous for all embodiments in the sense of the invention— can provide spring constants in a way whereby a block contact of the spring windings is not provided, but it can however also be advantageous to design at least one of the stops 2a, 30a in conjunction with the choice of the spring constants and the number of spring windings of the coil springs 31b, 32b axially so that an axial path of at least one of the closing bodies 2i, 2k is provided which is restricted by the block position of the spring windings, and thus with an optimized spring force a restricted axial path and thus for example the maximum pressure medium flow can be set. It is evident that the energy accumulator elements 31b, 32b can have different, for example linear, degressive, progressive spring characteristics.

Figure 12:
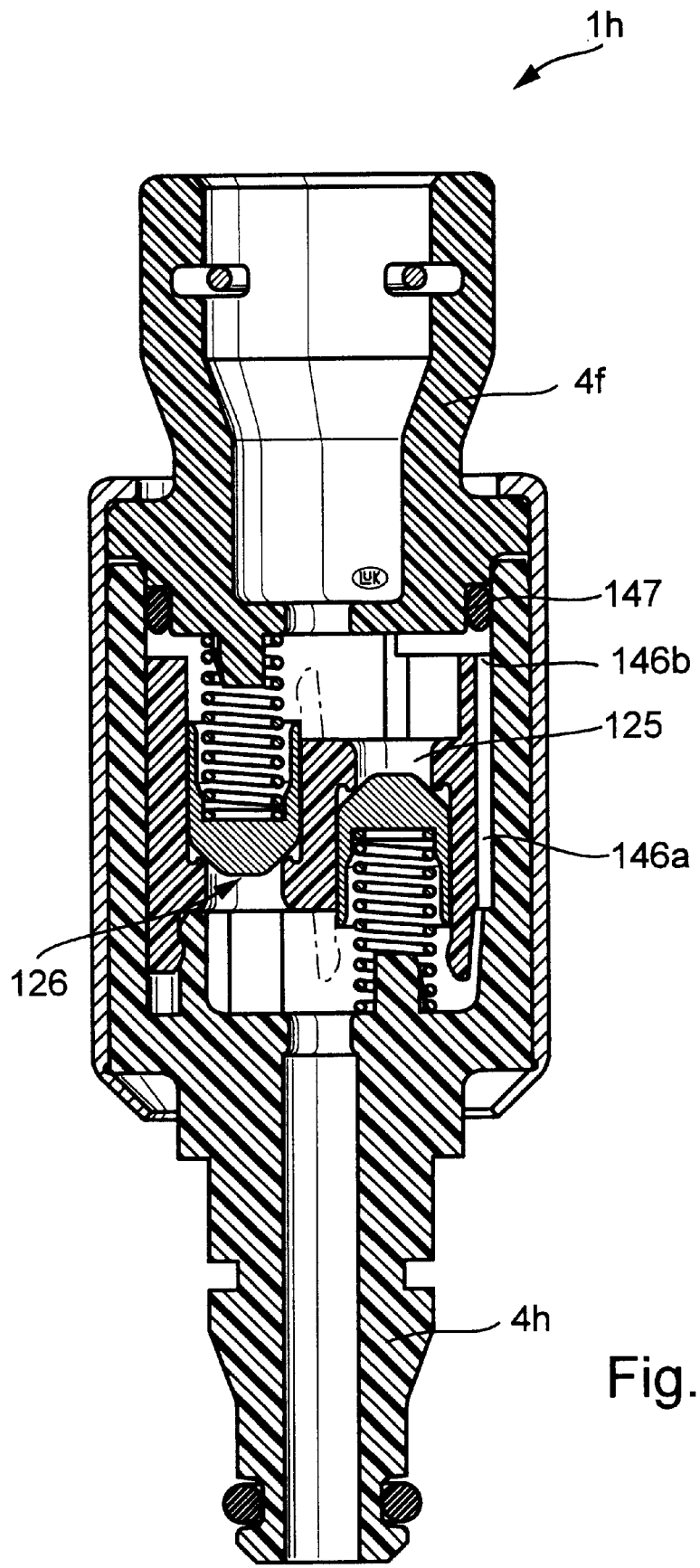
FIG. 12 shows another embodiment of a bi-directional pressure restricting valve.

FIG. 12 shows a pressure restricting valve 1h which is similar to the bi-directional pressure restricting valves 1f, 1g of FIGS. 10, 11 but with the advantageous difference that in order to seal the two housing parts 4f, 4h on the outside a sealing ring 147 is used which—as shown here—seals the two parts 4f, 4h radially from each other. The dimensions and choice of material for the sealing ring 147 is made so that during assembly a sealing action is already produced in the radial direction, but the material, for example NBE, of the sealing ring 147 swells up in the axial direction under the influence of the pressure medium, for example DOT 4. In this way a by pass described in further detail with reference to FIG. 10 for vacuum-filling the pressure restricting valve 1h or the hydraulic system with same and the housing seal can be represented by means of a single seal 147 in that a duct 146a by-passing the closed valves 125, 126 is opened at the start of vacuum-filling and the mouth opening 146b of the duct 146a is sealingly closed by means of the seal 147 which swells up axially on contact with the pressure medium.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Hydraulic system for a motor vehicle, comprising a pressure medium, at least one pressure restricting valve with a housing, the housing comprising at least two connections and at least one conduit cross-section that can be closed by means of a closing body which can be moved axially against the action of an energy accumulator, wherein at least one part of the axial movement of the closing body is damped by means of a damping device, wherein the pressure restricting valve separates a first conduit from a second conduit, wherein the hydraulic system further comprises a filler opening for filling the first and second conduits with the pressure medium, and wherein the hydraulic system can be filled completely from the filler opening.

2. The hydraulic system according to claim 1, wherein the closing body is designed hollow and is conical in the region of a contact surface with the at least one conduit cross-section, wherein further the closing body on the side remote from the contact surface has an opening into which the energy accumulator engages, and wherein the energy accumulator bears axially against a base of the closing body on one side and against the housing of the pressure restricting valve on the other.

3. The hydraulic system according to claim 1, wherein the hydraulic system is adapted to be used in a release mechanism for a shift clutch, said shift clutch being arranged between a crankshaft of an internal combustion engine and a gear input shaft of a gearbox.

4. The hydraulic system according to claim 1, wherein the hydraulic system is adapted to be used in a brake system of a motor vehicle.

5. The hydraulic system according to claim 1, wherein the hydraulic system is adapted to be used in a power steering system of a motor vehicle.

6. The hydraulic system according to claim 1, wherein the damping device comprises at least one energy accumulator element and at least one friction element.

7. The hydraulic system according to claim 6, wherein the at least one energy accumulator element and the at least one friction element are in serial, parallel or hybrid-active contact with each other.

8. The hydraulic system according to claim 6, wherein the at least one energy accumulator element comprises at least a spring element which acts against the closing body.

9. The hydraulic system according to claim 6, wherein the at least one energy accumulator element is installed under pre-tension.

10. The hydraulic system according to claim 6, wherein the at least one friction element is based on mechanical friction.

11. The hydraulic system according to claim 6, wherein the at least one friction element is based on fluid friction.

12. The hydraulic system according to claim 11, wherein the at least one friction element is based on a shearing action of a viscous fluid.

13. The hydraulic system according to claim 1, comprising two pressure restricting valves, wherein said two pressure restricting valves together comprise one housing and one of the pressure restricting valves acts in an opposite sense than the other.

14. The hydraulic system according to claim 1, wherein the closing body of the at least one pressure restricting valve consists of at least two parts which can be displaced relative to each other.

15. The hydraulic system according to claim 14, wherein the two parts form between each other a chamber having a volume which is dependent on the displacement of the two parts relative to each other.

16. The hydraulic system according to claim 15, wherein the chamber is filled with a compressible fluid.

17. The hydraulic system according to claim 16, wherein the compressible fluid is constituted by the pressure medium.

18. The hydraulic system according to claim 14, wherein one of the two parts bears against the housing.

19. The hydraulic system according to claim 14, wherein the two parts are tensioned against each other through the energy accumulator.

20. The hydraulic system according to claim 1, wherein the closing body has a hollow shape, the hydraulic system further comprises a piston ram fixedly connected to the housing and engaged with axial mobility in said hollow-shaped closing body, and wherein the piston ram and closing body are biased axially against each other by means of the energy accumulator.

21. The hydraulic system according to claim 20, further comprising a mechanical friction device interposed between the outside surface of the piston ram and the inside surface of the closing body.

22. The hydraulic system according to claim 20, wherein between the piston ram and the closing body there is at least one groove for the escape of pressure medium from a chamber formed by the ram and closing body.

23. The hydraulic system according to claim 1, further comprising a damping piston that is axially displaceable in the closing body.

24. The hydraulic system according to claim 23, wherein the damping piston is tensioned against the closing body by the action of the energy accumulator.

25. The hydraulic system according to claim 24, wherein the damping piston is seated against a stop that is fixed on the housing.

26. The hydraulic system according to claim 14, wherein at least one of the two parts has an opening through which pressure medium can escape when the two parts are moved relative to each other.

27. The hydraulic system according to claim 1, wherein the pressure medium comprises a viscous fluid and wherein the at least one conduit cross-section and the viscosity of the fluid are matched to each other so that a hydrodynamic friction device is produced.

28. The hydraulic system according to claim 1, wherein the pressure medium comprises a viscous fluid and wherein the at least one conduit cross-section, the viscosity of the fluid and the energy accumulator are matched to each other so as to effect a desired degree of damping of vibrations interfering in the operation of the hydraulic system.

29. The hydraulic system according to claim 28, wherein the vibrations have a frequency of less than 1 kHz.

30. The hydraulic system according to claim 28, wherein the vibrations are vibrations of an internal combustion engine of the motor vehicle and belong to one of the modes of vibration consisting of axial vibrations and tumbling vibrations.

31. The hydraulic system according to claim 1, further comprising a valve seat arranged in the at least one conduit cross-section, wherein the closing body seals the valve seat.

32. The hydraulic system according to claim 31, wherein one end of the closing body has a conical shape in the region of the valve seat.

33. The hydraulic system according to claim 32, wherein the conical end of the closing body has a cone angle of less than 90° and more than 20°.

34. Hydraulic system for a motor vehicle, comprising a pressure medium, at least one pressure restricting valve with a housing, the housing comprising at least two connections and at least one conduit cross-section with a valve seat that can be closed by means of a closing body which can be moved axially against the action of an energy accumulator, wherein at least one part of the axial movement of the closing body is damped by means of a damping device, wherein the hydraulic system further comprises an inlet pipe and an outlet pipe for the pressure medium, wherein the inlet pipe and the outlet pipe are on opposite sides of the at least one pressure restricting valve, but the inlet pipe opens directly after the valve seat into the outlet pipe, and the outlet pipe is arranged at an angle to the inlet pipe.

35. The hydraulic system according to claim 34, wherein the angle between the inlet pipe and outlet pipe is in a range from 135° to 45°.

36. The hydraulic system according to claim 34, wherein the inlet pipe and the outlet pipe are connected during an initial filling with the pressure medium by means of a by-pass to short-circuit the pressure restricting valve.

37. The hydraulic system according to claim 34, further comprising a seal between the inlet pipe and the outlet pipe, wherein said seal becomes operational only after an initial filling with the pressure medium.

38. The hydraulic system according to claim 37, wherein the seal swells up on contact with the pressure medium.

39. The hydraulic system according to claim 38, wherein the seal is seated in the non-swollen state and during the swelling process at one of its radially outer sealing surface and radially inner sealing surface and, by swelling up, sealingly closes a gap on the radially opposite side.

40. The hydraulic system according to claim 37, wherein the seal is made from a material which swells up by absorbing the pressure medium.

41. The hydraulic system according to claim 40, wherein the material is nitrile butadiene rubber.

* * * * *